United States Patent
Oyobe et al.

(10) Patent No.: US 7,265,455 B2
(45) Date of Patent: Sep. 4, 2007

(54) ALTERNATING VOLTAGE OUTPUT APPARATUS AND VEHICLE INCLUDING SUCH ALTERNATING VOLTAGE OUTPUT APPARATUS

(75) Inventors: Hichirosai Oyobe, Toyota (JP); Hiromi Tonegawa, Konan (JP); Tetsuhiro Ishikawa, Nishikamo-gun (JP); Takeshi Shingai, Nisshin (JP); Yukihiro Minezawa, Anjo (JP)

(73) Assignees: Toyota Jidosha Kabushiki Kaisha, Toyota-shi (JP); Aisin AW Co., Ltd., Anjo-shi (JP)

(*) Notice: Subject to any disclaimer, the term of this patent is extended or adjusted under 35 U.S.C. 154(b) by 63 days.

(21) Appl. No.: 11/288,309

(22) Filed: Nov. 29, 2005

(65) Prior Publication Data

US 2006/0113798 A1   Jun. 1, 2006

(30) Foreign Application Priority Data

Nov. 30, 2004   (JP) .............................. 2004-346916

(51) Int. Cl.
*H02P 9/04* (2006.01)
(52) U.S. Cl. .................... 290/1 R; 290/1 A; 290/40 R; 123/198 DC; 123/1 A
(58) Field of Classification Search ................ 290/1 R, 290/1 A, 2, 4 R, 4 A, 40 R, 41; 123/1 A, 123/198 DC
See application file for complete search history.

(56) References Cited

U.S. PATENT DOCUMENTS

| | | | |
|---|---|---|---|
| 4,440,115 A * | 4/1984 | Allen | 123/1 A |
| 5,099,186 A | 3/1992 | Rippel et al. | |
| 6,068,672 A * | 5/2000 | Watson et al. | 44/629 |
| 6,082,322 A * | 7/2000 | Graham et al. | 123/196 S |
| 6,107,691 A * | 8/2000 | Gore et al. | 290/1 R |
| 6,851,396 B2 * | 2/2005 | Fromont | 123/1 A |
| 7,044,113 B2 * | 5/2006 | Bingham et al. | 123/523 |
| 7,213,580 B1 * | 5/2007 | Beyer et al. | 123/509 |

FOREIGN PATENT DOCUMENTS

| | | |
|---|---|---|
| JP | 2695083 | 12/1997 |
| JP | 10-225014 | 8/1998 |
| JP | 2001-008380 | 1/2001 |
| JP | 2001-258177 | 9/2001 |
| JP | 2002-204503 | 7/2002 |
| JP | 2002-374604 | 12/2002 |

* cited by examiner

*Primary Examiner*—Nicholas Ponomarenko
(74) *Attorney, Agent, or Firm*—Kenyon & Kenyon LLP (57) ABSTRACT

A control device controls first and second inverters such that alternating voltage is generated across neutral points of first and second motor generators. When the value of a signal representative of the remaining amount of fuel in a fuel tank becomes lower than a predetermined threshold value, the control device controls the first and second inverters such that the voltage level of the alternating voltage is changed in order to notify a user external to the vehicle of the low remaining amount of fuel.

5 Claims, 10 Drawing Sheets

ALTERNATING VOLTAGE OUTPUT APPARATUS AND VEHICLE INCLUDING SUCH ALTERNATING VOLTAGE OUTPUT APPARATUS

This nonprovisional application is based on Japanese Patent Application No. 2004-346916 filed with the Japan Patent Office on Nov. 30, 2004, the entire contents of which are hereby incorporated by reference.

BACKGROUND OF THE INVENTION

1. Field of the Invention

The present invention relates to an alternating voltage output apparatus and a vehicle including such an alternating voltage output apparatus. Particularly, the present invention relates to an alternating voltage output apparatus incorporated into a hybrid vehicle, an electric car, and the like, generating alternating voltage for commercial power supply to provide the generated alternating voltage to an external load, and a vehicle including such an alternating voltage output apparatus.

2. Description of the Related Art

Japanese Patent No. 2695083 discloses a motor drive and power processing apparatus employed in a vehicle that is driven by electric power. The motor drive and power processing apparatus includes a secondary battery, inverters IA and IB, induction motors MA and MB, and a control unit. Induction motors MA and MB include windings CA and CB, respectively, in a Y-connection. An input/output port is connected to neutral points NA and NB of windings CA and CB via an EMI filter.

Inverters IA and IB are provided corresponding to induction motors MA and MB, and connected to windings CA and CB, respectively. Inverters IA and IB are connected parallel to the secondary battery.

When operating in a recharge mode in this motor drive and power processing apparatus, alternating current power is supplied across neutral points NA and NB of windings CA and CB from a single phase power supply connected to the input/output port via the EMI filter. Inverters IA and IB convert the alternating current power supplied across neutral points NA and NB into direct current power to charge the direct current power supply.

In the motor drive and power processing apparatus, inverters IA and IB can generate alternating current power having an adjusted sinusoidal wave across neutral points NA and NB and provide the generated alternating current power to an external apparatus connected to the input/output port.

The motor drive and power processing apparatus disclosed in Japanese Patent No. 2695083 is not convenient, however, since the user cannot identify at a position remote from the vehicle how much alternating current power is left to be supplied when the motor drive and power processing apparatus is generating and providing to an external apparatus the alternating current power.

In other words, when the alternating current power from the motor drive and power processing apparatus incorporated into the vehicle is used as an emergency electric power source for a domestic load, it is inconvenient for the user to go all the way to the vehicle to check the remaining amount of energy of the vehicle. If the user fails to check the remaining amount of energy, the undesired event of sudden blackout may occur, or the user may not be able to drive the vehicle by itself to the nearest fuel station.

SUMMARY OF THE INVENTION

In view of the foregoing, an object of the present invention is to provide an alternating voltage output apparatus that provides notification externally when the remaining amount of energy of the vehicle becomes low.

Another object of the present invention is to provide a vehicle incorporating an alternating voltage output apparatus that provides notification externally when the remaining amount of energy of the vehicle becomes low.

According to an aspect of the present invention, an alternating voltage output apparatus is incorporated into a vehicle, and includes an internal combustion engine, a fuel tank storing fuel to be supplied to the internal combustion engine, a voltage supply device generating alternating voltage having a predetermined frequency using electric power generated through a driving force from the internal combustion engine, and supplying the generated alternating voltage to a load external to the vehicle, and a control device controlling an operation of the voltage supply device. The control device controls the voltage supply device such that, when the remaining amount of fuel is lower than a predetermined amount, the alternating voltage changes in a manner different from the alternating voltage of a state where the remaining amount of fuel is not lower than the predetermined amount.

Preferably, the control device controls the voltage supply device such that the alternating voltage is cut off through short interruption when the remaining amount of fuel is lower than a predetermined amount.

Preferably, the control device controls the voltage supply device such that the level of the alternating voltage is lowered down to a predetermined voltage level when the remaining amount of fuel is lower than a predetermined amount.

Preferably, the control device controls the voltage supply device such that the voltage level of the alternating voltage changes periodically when the remaining amount of fuel is lower than a predetermined amount.

Preferably, the control device controls the voltage supply device such that the changing cycle of the voltage level of the alternating voltage becomes shorter or longer in accordance with reduction in the remaining amount of fuel.

According to another aspect of the present invention, an alternating voltage output apparatus is incorporated into a vehicle, and includes an internal combustion engine, a fuel tank storing fuel to be supplied to the internal combustion engine, a voltage supply device generating alternating voltage having a predetermined frequency using electric power generated through a driving force from the internal combustion engine, and supplying the generated alternating voltage to a load external to the vehicle when the vehicle is off, and a control device controlling an operation of the voltage supply device. The control device operates a sounding device or light device of the vehicle.

Preferably, the control device operates the sounding device during the daytime, and the light device during the nighttime.

Preferably, the voltage supply device includes a power generator linked to the internal combustion engine, and including a first three-phase coil in a Y-connection as a stator coil, a motor including a second three-phase coil in a Y-connection, and first and second inverters connected to and driving the power generator and motor, respectively, based on a control signal from the control device. The control device controls the first and second inverters such that alternating voltage is generated across neutral points of the first and second three-phase coils.

Preferably, the voltage supply device includes an inverter converting direct current voltage generated using a driving force from the internal combustion engine into alternating voltage.

According to the present invention, a vehicle includes an alternating voltage output apparatus set forth above.

In the alternating voltage output apparatus of the present invention, the control device controls the voltage supply device such that, when the remaining amount of fuel in the fuel tank is lower than a predetermined amount, the alternating voltage changes in a manner different from the alternating voltage of the state where the remaining amount of fuel is not lower than the predetermined amount. Therefore, notification that the remaining suppliable period of alternating voltage is short is provided external to the vehicle, dispensable of additional notification means.

According to the present invention, an external notification function directed to a state where the remaining period of allowing alternating voltage output is short can be realized at low cost. Further, since the supplied alternating voltage per se changes, the user outside the vehicle who is using an external load that receives supply of the alternating voltage to operate can reliably be notified of the remaining state of fuel. The convenience for the user is improved since the user does not have to purposely go to the vehicle to check the remaining state of fuel.

In the alternating voltage output apparatus of the present invention, the control device operates the sounding device or light device of the vehicle when the remaining amount of fuel is lower than a predetermined amount. Therefore, notification that the remaining period of allowing alternating voltage output is short can be provided externally with no additional notification means.

According to the present invention, an external notification function directed to a state where the remaining period of allowing alternating voltage output is short can be realized readily and at low cost.

According to the alternating voltage output apparatus of the present invention, alternating voltage can be generated using first and second three-phase coils included as stator coils in the power generator and motor, respectively, across the neutral points of the first and second three-phase coils, and be supplied to an external load.

Since the alternating voltage output apparatus of the present invention includes an inverter that converts the direct-current voltage generated through a driving force from the internal combustion engine into an alternating voltage, alternating voltage can generated through the inverter and supplied to an external load.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings. In the drawings, the same or corresponding elements have the same reference characters allotted, and description thereof will not be repeated.

First Embodiment

Figure 1:
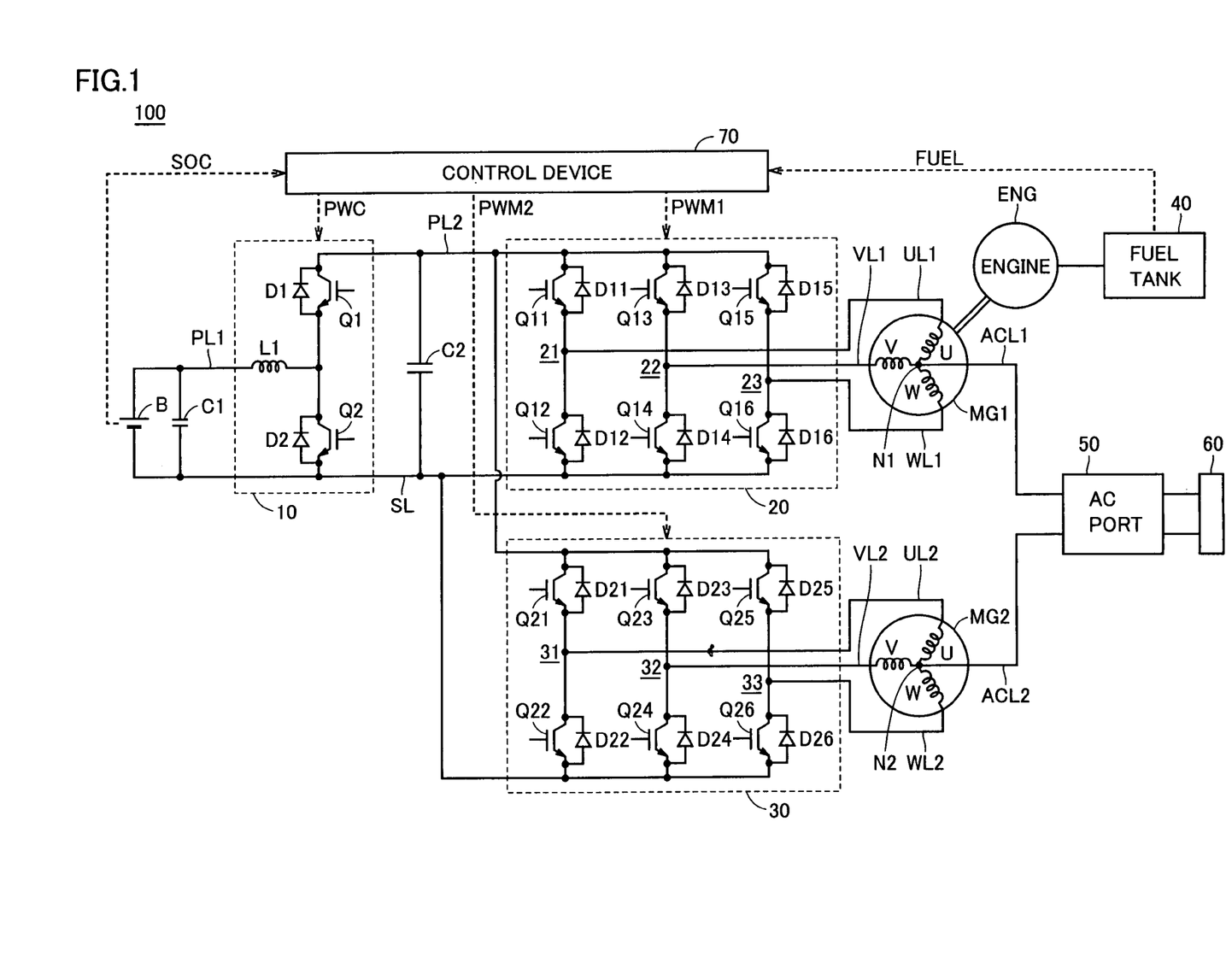
FIG. 1 is a schematic block diagram of an alternating voltage output apparatus according to a first embodiment of the present invention.

Referring to FIG. 1, an alternating voltage output apparatus 100 according to a first embodiment of the present invention includes a battery B, an up-converter 10, inverters 20 and 30, motor generators MG1 and MG2, an engine ENG, a fuel tank 40, an AC port 50, a connector 60, a control device 70, capacitors C1 and C2, power supply lines PL1 and PL2, a ground line SL, U-phase lines UL1 and UL2, V-phase lines VL1 and VL2, W-phase lines WL1 and WL2, and AC lines ACL1 and ACL2.

Alternating voltage output apparatus 100 is implemented, for example, through a power output apparatus incorporated into a hybrid vehicle. Specifically, motor generator MG1 is incorporated into the hybrid vehicle to operate as a power generator driven by engine ENG and to operate as a motor that can start the engine. Motor generator MG2 is incorporated into the hybrid vehicle as a motor that drives a driving wheel of the hybrid vehicle.

Battery B identified as a direct-current power supply is formed of, for example, a nickel-hydrogen or lithium-ion secondary battery. Battery B outputs the generated direct-current voltage to up-converter 10, and is charged by the direct-current voltage output from up-converter 10.

Up-converter 10 includes a reactor L1, npn transistors Q1 and Q2, and diodes D1 and D2. Reactor L1 has one end connected to a power supply line PL1, and the other end connected to the connection node of npn transistors Q1 and Q2. Npn transistors Q1 and Q2 each are formed of, for example, IGBT (Insulated Gate Bipolar Transistor), and are connected in series between a power supply line PL2 and a ground line SL to receive a signal PWC from control device 70 at the base. Diodes D1 and D2 are connected across the collector and emitter of each of npn transistors Q1 and Q2, respectively, so as to conduct current from the emitter side to the collector side.

Up-converter 10 boosts the direct-current voltage supplied from battery B via power supply line PL1 to output the boosted voltage onto power supply line PL2. Specifically, up-converter 10 responds to signal PWC from control device 70 to boost the direct-current voltage from battery B by accumulating the current that flows according to the switching operation of npn transistor Q2 as magnetic field energy at reactor L1, and provides the boosted power onto power supply line PL2 via diode D1 in synchronization with the OFF timing of npn transistor Q2. Up-converter 10 responds to signal PWC from control device 70 to down-convert the direct-current voltage received from inverter 20 and/or 30 via power supply line PL2 down to the voltage level of battery B to charge battery B.

Inverter 20 includes a U-phase arm 21, a V-phase arm 22, and a W-phase arm 23, which are connected in parallel between power supply line PL2 and ground line SL. U-phase arm 21 is formed of npn transistors Q11 and Q12 connected in series. W-phase arm 22 is formed of npn transistors Q13 and Q14 connected in series. W-phase arm 23 is formed of npn transistors Q15 and Q16 connected in series. Each of npn type transistors Q11-Q16 is formed of, for example, an IGBT. Diodes D11-D16 conducting current from the emitter side to the collector side are connected between the collector and emitter of respective npn transistors Q11-Q16. The connection node of each npn transistor in each phase arm is connected via the U, V, and W-phase lines of UL1, VL1 and WL1 to respective phase coils of motor generator MG1 at an end opposite to the end corresponding to neutral point N1.

Inverter 20 responds to a signal PWM1 from control device 70 to convert the direct-current voltage supplied from power supply line PL2 into a three-phase alternating voltage to drive motor generator MG1. Accordingly, motor generator MG1 is driven to generate torque specified by a torque control value TR1. Inverter 20 also receives an output from engine ENG to convert the three-phase alternating voltage from motor generator MG1 into a direct current voltage based on signal PWM1 from control device 70, and outputs the converted direct-current voltage onto power supply line PL2.

Inverter 30 includes a U-phase arm 31, a V-phase arm 32, and a W-phase arm 33, which are connected in parallel between power supply line PL2 and ground line SL. U-phase arm 31 is formed of npn transistors Q21 and Q22 connected in series. V-phase arm 32 is formed of npn transistors Q23 and Q24 connected in series. W-phase arm 33 is formed of npn transistors Q25 and Q26 connected in series. Each of npn transistors Q21-Q26 is formed of, for example, an IGBT. Diodes D21-D26 conducting current from the emitter side to the collector side are connected across the collector and emitter of npn transistors Q21-Q26, respectively. In converter 30, the connection nodes of respective npn transistors in each phase arm are connected via the U, V and W-phase lines of UL2, VL2, and WL2 to respective phase coils of motor generator MG2 at an end opposite to the end corresponding to neutral point N2.

Inverter 30 responds to signal PWM2 from control device 70 to convert the direct-current voltage supplied from power supply line PL2 into a three-phase alternating voltage to drive motor generator MG2. Accordingly, motor generator MG2 is driven to generate torque specified by a torque control value TR2. At a time of regenerative braking of the hybrid vehicle into which alternating voltage output apparatus 100 is incorporated, inverter 30 converts the three-phase alternating voltage generated by motor generator MG2 through reception of the driving wheel into direct current voltage based on signal PWM2 from control device 70, and outputs the converted direct current voltage onto power supply line PL2.

Capacitor C1 is connected between power supply line PL1 and ground line SL to smooth the voltage variation between power supply line PL1 and ground line SL. Capacitor C2 is connected between power supply line PL2 and ground line SL to smooth the voltage variation between power supply line PL2 and ground line SL.

Each of motor generators MG1 and MG2 is formed of, for example, a three-phase alternating synchronous motor, and includes a three-phase coil in a Y-connection as a stator coil. Motor generator MG1 is driven by inverter 20 to generate a three-phase alternating voltage using the output of engine ENG to output the generated three-phase alternating voltage to inverter 20. Motor generator MG1 generates a driving force by the three-phase alternating voltage from inverter 20 to start engine ENG. Motor generator MG2 is driven by inverter 30 to generate a driving torque of the vehicle by the three-phase alternating voltage from inverter 30. At the time of regenerative braking of the vehicle, motor generator MG2 generates and provides to inverter 30 a three-phase alternating voltage.

AC lines ACL1 and ACL2 are connected to neutral points N1 and N2 of motor generators MG1 and MG2, respectively. Motor generators MG1 and MG2 provide alternating voltage Vac generated across neutral points N1 and N2 to AC lines ACL1 and ACL2, as will be described afterwards.

Engine ENG is started by receiving a driving force from motor generator MG1. Following starting, engine ENG generates power using the fuel from fuel tank 40 to drive motor generator MG1. Fuel tank 40 supplies fuel to engine ENG. Fuel tank 40 outputs a signal FUEL representative of the remaining amount of fuel to control device 70.

AC port 50 establishes connection/disconnection of AC lines ACL1 and ACL2 to/from connector 60 according to an operation control from control device 70. Connector 60 is an output terminal to provide alternating voltage Vac generated across neutral points N1 and N2 of motor generators MG1 and MG2 to a load external to the vehicle. A plug of an electrical apparatus or a domestic emergency electric power source will be connected to connector 60.

Control device 70 generates a signal PWC directed to driving up-converter 10, based on torque control values TR1 and TR2 as well as motor revolution counts MRN1 and MRN2 of motor generators MG1 and MG2, battery voltage Vb of battery B, and output voltage Vdc of up-converter 10 (corresponding to the input voltages of inverters 20 and 30). The generated signal PWC is output to up-converter 10. Each of motor revolution counts MRN1 and MRN2 of motor generators MG1 and MG2, battery voltage Vb of battery B, and output voltage Vdc of up-converter 10 is detected by respective sensors not shown.

Further, control device 70 generates a signal PWM1 directed to driving motor generator MG1, based on voltage Vdc and also motor current MCRT1 and torque control value TR1 of motor generator MG1. The generated signal PWM1 is output to inverter 20. Control device 70 generates a signal PWM2 directed to driving motor generator MG2, based on voltage Vdc and also motor current MCRT2 and torque control value TR2 of motor generator MG2. The generated signal PWM2 is output to inverter 30. Motor currents MCRT1 and MCRT2 of motor generators MG1 and MG2, respectively, are detected by current sensors not shown.

Upon output request of alternating voltage Vac to an external load connected to connector 60, control device 70 generates signals PWM1 and PWM2 to control inverters 20 and 30 such that alternating voltage Vac for commercial power supply is generated across neutral points N1 and N2 of motor generators MG1 and MG2. An output request of alternating voltage Vac occurs when a connector on the part of the external load is connected to connector 60 and the AC output switch is operated during an off state of the vehicle.

When the value of signal FUEL representative of the fuel remaining amount in fuel tank 40 is lower than a threshold value R0, control device 70 generates signals PWM1 and PWM2 such that the output of alternating voltage Vac generated across neutral points N1 and N2 of motor generators MG1 and MG2 changes. Specifically, when the remaining amount of fuel in fuel tank 40 becomes low, alternating voltage output apparatus 100 changes alternating voltage Vac in accordance with a method that will be described afterwards to notify the user outside the vehicle (for example, the user using the hybrid vehicle into which alternating voltage output apparatus 100 is incorporated as a domestic emergency electric power supply) of the low remaining fuel.

Figure 2:
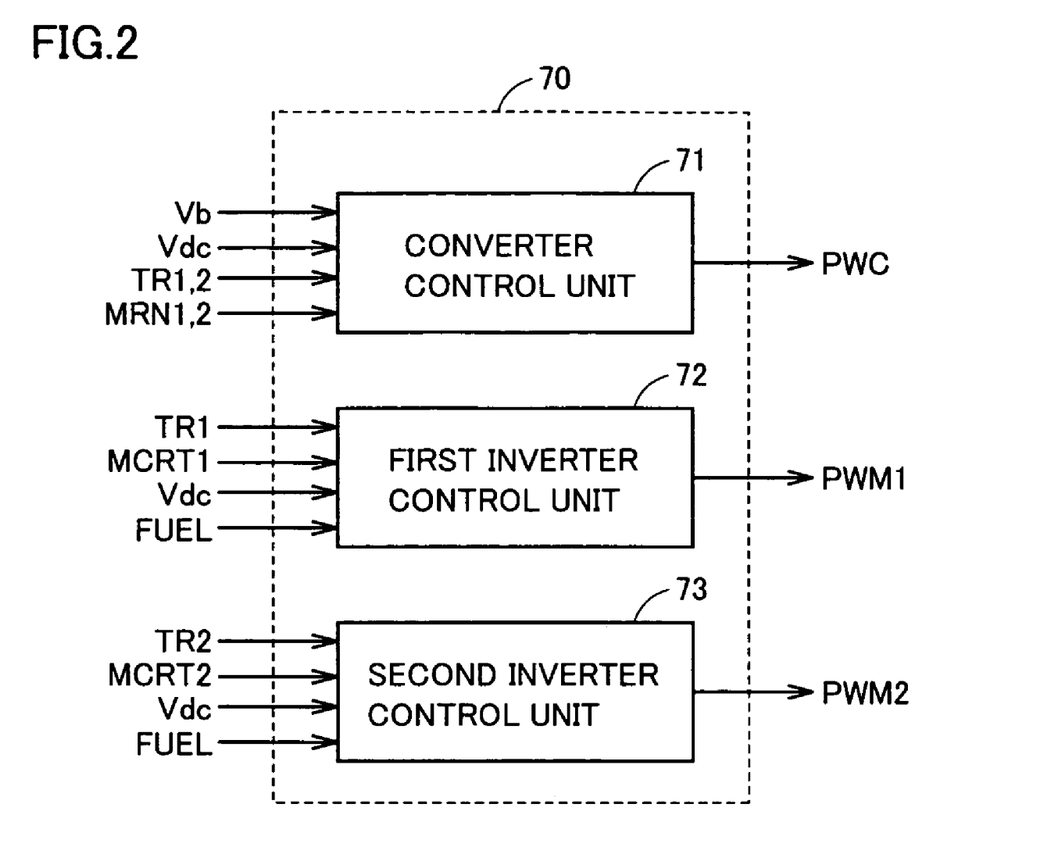
FIG. 2 is a functional block diagram of the control device in FIG. 1.

FIG. 2 is a functional block diagram of control device 70 in FIG. 1. Referring to FIG. 2, control device 70 includes a converter control unit 71, and first and second inverter control units 72 and 73. Converter control unit 71 generates a signal PWC to turn ON/OFF npn transistors Q1 and Q2 of up-converter 10 based on battery voltage Vb of battery B, output voltage Vdc of up-converter 10, torque control values TR1 and TR2, and motor revolution counts MRN1 and MRN2. The generated signal PWC is output to up-converter 10.

First inverter control unit 72 generates a signal PWM1 to turn ON/OFF npn transistors Q11-Q16 of inverter 20, based on torque control value TR1 and motor current MCRT1 of motor generator MG1, input voltage Vdc of inverter 20, and signal FUEL representative of the remaining amount of fuel in fuel tank 40. The generated signal PWM1 is output to inverter 20.

Second inverter control unit 73 generates a signal PWM2 to turn ON/OFF npn transistors Q21-Q26 of inverter 30 based on torque control value TR2 and motor current MCRT2 of motor generator MG2, input voltage Vdc of inverter 30, and signal FUEL from fuel tank 40. The generated signal PWM2 is output to inverter 30.

Figure 3:
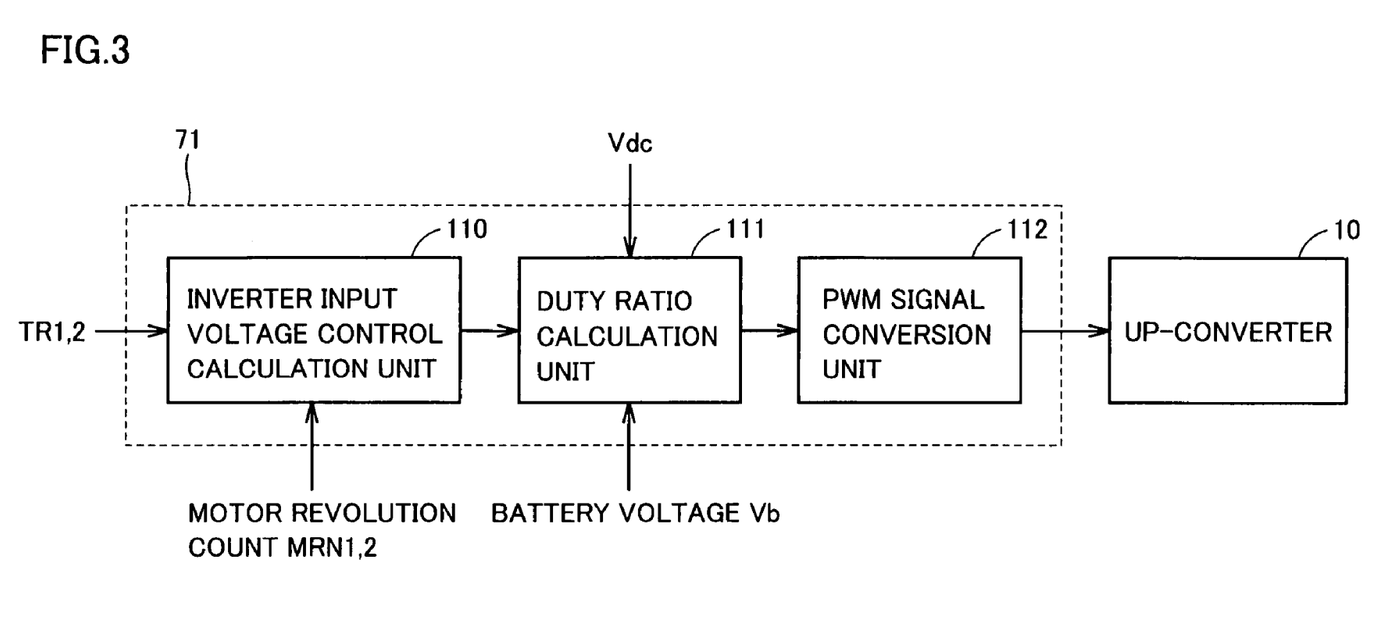
FIG. 3 is a functional block diagram of the converter control unit in FIG. 2.

FIG. 3 is a functional block diagram of converter control unit 71 in FIG. 2. Referring to FIG. 3, converter control unit 71 includes an inverter input voltage control calculation unit 110, a duty ratio calculation unit 111, and a PWM signal conversion unit 112.

Inverter input voltage control calculation unit 110 calculates an optimum value of inverter input voltage (target value) based on torque control signals TR1 and TR2 as well as motor revolution counts MRN1 and MRN2 to provide the calculated target value to duty ratio calculation unit 111.

Duty ratio calculation unit 111 calculates the duty ratio required to set input voltage Vdc of inverters 20 and 30 at the target value, based on battery voltage Vb of battery B, input voltage Vdc of inverters 20 and 30, and the target value from inverter input voltage control calculation unit 110. The calculated duty ratio is output to PWM signal conversion unit 112.

PWM signal conversion unit 112 generates a signal PWC to turn ON/OFF npn type transistors Q1 and Q2 of up-converter 10 based on the duty ratio from duty ratio calculation unit 111. The generated signal PWC is output to npn transistors Q1 and Q2 of up-converter 10.

Since the accumulated power at reactor L1 becomes larger by increasing the ON duty of npn transistor Q2 in the lower arm of up-converter 10, an output of higher voltage can be obtained. The voltage on power supply line PL2 is reduced by increasing the ON duty of npn transistor Q1 of the upper arm. Therefore, by controlling the duty ratio of npn transistors Q1 and Q2, the voltage on power supply line PL2 can be set to an arbitrary voltage equal to or higher than the output voltage of battery B.

Figure 4:
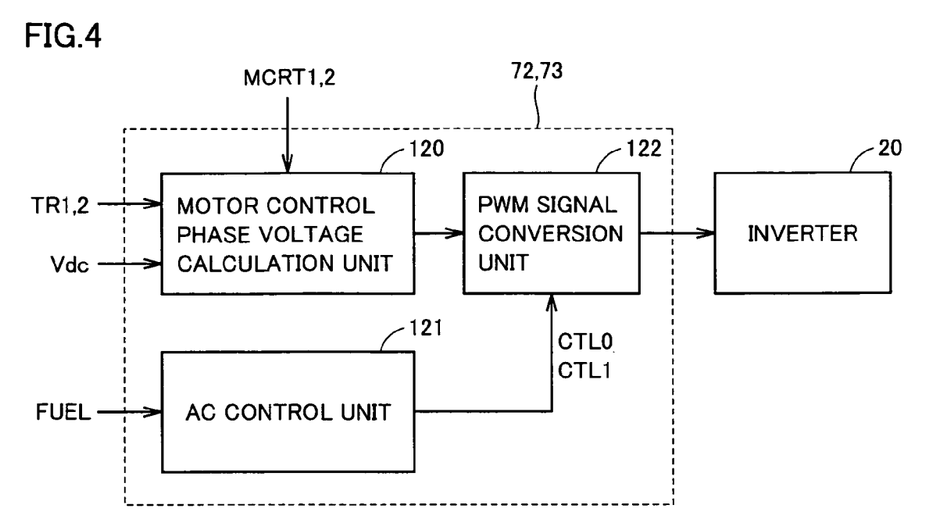
FIG. 4 is a functional block diagram of first and second inverter control units in FIG. 2.

FIG. 4 is a functional block diagram of first and second inverter control units 72 and 73 of FIG. 2. Referring to FIG. 4, each of first and second inverter control units 72 and 73 includes a motor control phase voltage calculation unit 120, an AC control unit 121, and a PWM signal conversion unit 122.

Motor control phase voltage calculation unit 120 calculates the voltage to be applied to each phase coil of motor generator MG1 (or MG2) based on torque control value TR1 (or TR2) and motor current MCRT1 (or MCRT2) of motor generator MG1 (or MG2) and also input voltage Vdc of inverters 20 and 30. The calculated coil voltage of each phase is output to PWM signal conversion unit 122.

AC control unit 121 generates and provides to PWM signal conversion unit 122 control signals CTL0 and CTL1 to generate alternating voltage Vac. Specifically, when output of alternating voltage Vac towards an external load connected to connector 60 is requested, AC control unit 121 determines whether the remaining amount of fuel in fuel tank 40 represented by signal FUEL is lower than a threshold value R0 or not. When determination is made that the fuel remaining amount is not lower than threshold value R0, control signal CTL0 is generated. When determination is made that the fuel remaining amount is lower than threshold value R0, control signal CTL1 is generated. The generated control signal is output to PWM signal conversion unit 122.

When neither control signal CTL0 nor CTL1 is received from AC control unit 121, PWM signal conversion unit 122 generates a signal PWM1_0 (one type of signal PWM1) (or PWM2_0 (one type of signal PWM2)) that actually turns on/off each of npn transistors Q11-Q16 (or Q21-Q26) of inverter 20 (or 30), based on the voltage control value of each phase coil received from motor control phase voltage calculation unit 120. The generated signal PWM1_0 (or PWM2_0) is output to each of npn transistors Q11-Q16 (Or Q21-Q26) of inverter 20 (or 30).

PWM signal conversion unit 122 generates, upon receiving control signal CTL0 from AC control unit 121, a signal PWM1_1 (one type of signal PWM1) (or PWM2_1 (one type of signal PWM2)) that turns on/off each of npn transistors Q11-Q16 (or Q21-Q26) of inverter 20 (or 30) while altering the duty for switching control at the commercial alternating frequency, based on the voltage control value of each phase coil received from motor control phase voltage calculation unit 120. The generated signal PWM1_1 (or PWM2_1) is output to npn transistors Q11-Q16 (or Q21-Q26) of inverter 20 (or 30).

PWM signal conversion unit 122 generates, upon receiving control signal CTL1 from AC control unit 121, a signal PWM1_2 (one type of signal PWM1) (or signal PWM2_2 (one type of signal PWM2)) that turns on/off each of npn transistors Q11-Q16 (or Q21-Q26) of inverter 20 (or 30) while changing the duty according to a method that will be described afterwards with respect to the duty that is changed when control signal CTL0 is received. The generated signal PWM1_2 (or PWM2_2) is output to npn transistors Q11-Q16 (or Q21-Q26) of inverter 20 (or 30).

Figure 5:
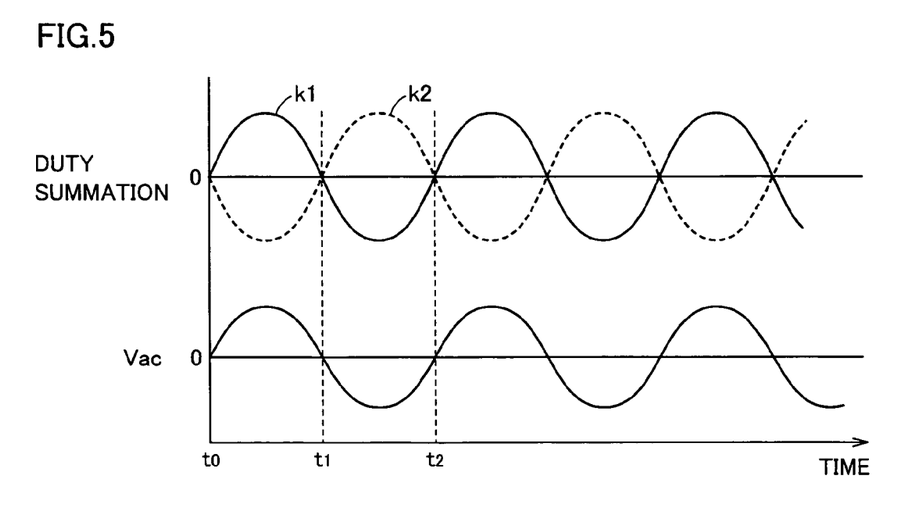
FIG. 5 is a waveform diagram of duty summation and alternating voltage when the remaining amount of fuel in the fuel tank is sufficient.

FIG. 5 is a waveform diagram of duty summation and alternating voltage Vac when the remaining amount of fuel in fuel tank 40 is sufficient. Namely, FIG. 5 corresponds to the waveform diagram when control signal CTL0 is output from AC control unit 121. Referring to FIG. 5, curve k1 represents the change in the duty summation at switching control of inverter 20, whereas curve k2 represents the change in the duty summation at switching control of inverter 30. As used herein, "duty summation" is the value of subtracting the ON duty of the lower arm from the ON duty of the upper arm in each inverter. In FIG. 5, a positive duty summation indicates that the potential at the neutral point of the corresponding motor generator is higher than an intermediate voltage Vdc/2 of input voltage Vdc of inverters 20 and 30, whereas a negative duty summation indicates that the neutral point potential is lower than intermediate potential Vdc/2.

When the remaining amount of fuel in fuel tank 40 is sufficient, i.e. when the value of signal FUEL from fuel tank 40 is not lower than threshold value R0, control device 70 changes the duty summation of inverter 20 and inverter 30 according to curves k1 and k2, respectively, that vary at the commercial alternating current frequency. Curve k2 is a curve corresponding to an inverted version of curve k1 in phase. Specifically, the duty summation of inverter 30 is altered periodically by a phase that is an inverted version of the phase by which the duty summation of inverter 20 is altered.

Thus, the potential at neutral point N1 becomes higher than voltage Vdc/2 whereas the potential at neutral point N2 becomes lower than voltage Vdc/2 to result in generation of positive alternating voltage Vac across neutral points N1 and N2 during time t0-t1. The extra current that cannot flow from the upper arm to the lower arm of inverter 20 flows from neutral point N1 to neutral point N2 via AC line ACL1, an external load, and AC line ACL2, and then from neutral point N2 to the lower arm of inverter 30.

During time t1-t2, the potential at neutral point N1 becomes lower than voltage Vdc/2 whereas the potential at neutral point N2 becomes higher than voltage Vdc/2 to result in negative alternating voltage Vac across neutral points N1 and N2. Accordingly, the extra current that cannot flow from the upper arm to the lower arm in inverter 30 flows from neutral point N2 towards neutral point N1 via AC line ACL2, the external load, and AC line ACL1, and then from neutral point N1 to the lower arm of inverter 20.

Thus, alternating voltage Vac that corresponds to the difference between the duty summation of inverter 20 that changes according to curve k1 and the duty summation of inverter 30 that changes according to curve k2 is generated across neutral points N1 and N2 of motor generators MG1 and MG2. In the present case where the remaining amount of fuel in fuel tank 40 is sufficient, curves k1 and k2 are set such that alternating voltage Vac corresponds to commercial alternating voltage (for example, AC 100V).

Figure 6:
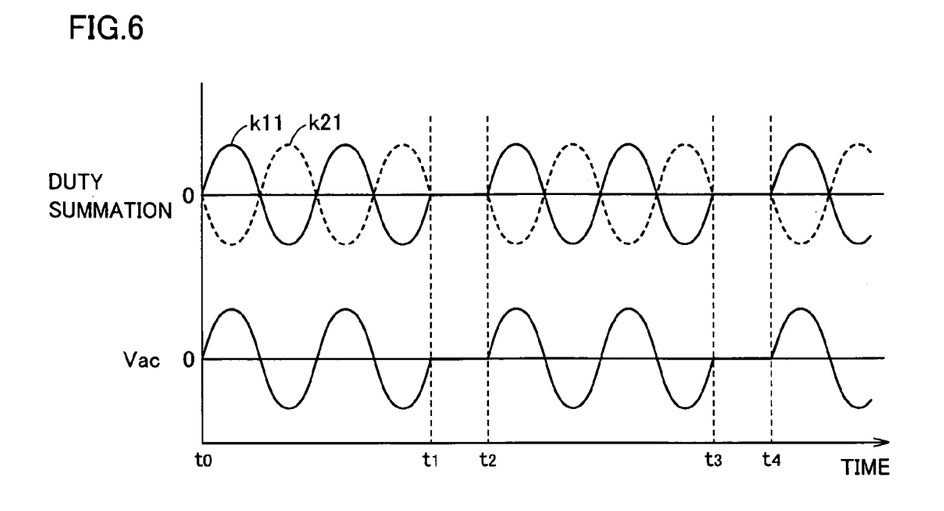
FIGS. 6 and 7 are first and second waveform diagrams, respectively, of duty summation and alternating voltage when the remaining amount of fuel in the fuel tank is low.

FIG. 6 is a first waveform diagram of the duty summation and alternating voltage Vac when the remaining amount of fuel in fuel tank 40 is low. Specifically, FIG. 6 corresponds to the case where AC control unit 121 outputs control signal CTL1. Referring to FIG. 6, control device 70 changes the duty summation at switching control of inverter 20 according to curve k11, and changes the duty summation at switching control of inverter 30 according to curve k21 when the remaining amount of fuel in fuel tank 40 is low, i.e. when the value of signal FUEL is lower than threshold value R0.

Specifically, at time t0-t1, the duty summation of inverters 20 and 30 is changed periodically at the commercial alternating frequency according to curves k11 and k21, respectively. At time t1-t2, the duty summation of inverters 20 and 30 is set to 0 instantaneously. At time t2-t3, the duty summation of inverters 20 and 30 is changed again periodically at the commercial alternating frequency according to curves k11 and k12, respectively. At time t3-t4, the duty summation of inverters 20 and 30 is set to 0 instantaneously. In other words, the duty summation of inverters 20 and 30 is set to 0 instantaneously for every constant period.

The period of setting the duty summation of inverters 20 and 30 to 0 instantaneously is selected to be set to an appropriate time that allows recognition by the user of the external load receiving supply of alternating voltage Vac, and that does not apply any considerable effect on the function of the external load. By cutting off alternating voltage Vac through short interruption at a predetermined cycle, the user can recognize that the remaining amount of fuel of the vehicle is low.

Figure 7:
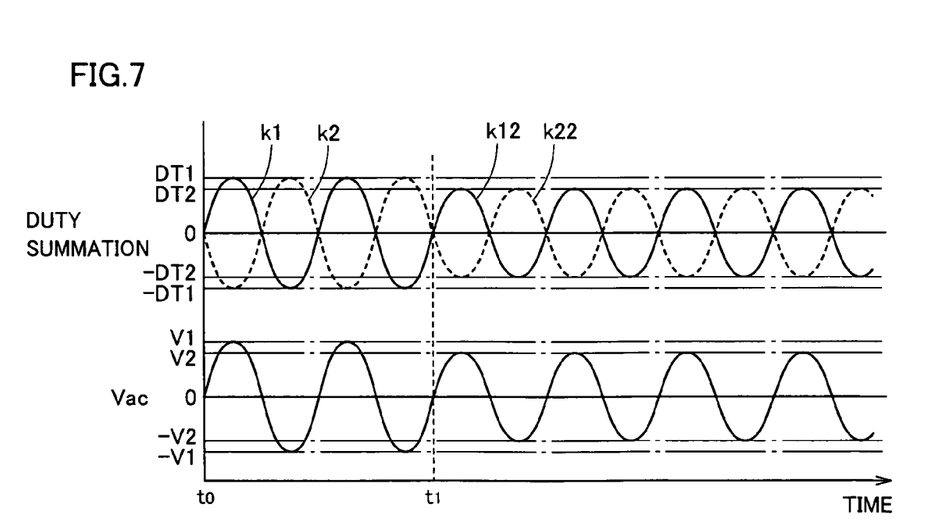

As an alternative to cutting off alternating voltage Vac through short interruption at predetermined cycle when the remaining amount of fuel becomes low as set forth above, alternating voltage Vac can be reduced within a range that will not greatly affect the function of the external load. FIG. 7 represents an operation waveform corresponding to the case where alternating voltage Vac is reduced when the remaining amount of fuel becomes low.

FIG. 7 is a second waveform diagram of duty summation and alternating voltage Vac when the remaining amount of a fuel in fuel tank 40 is low. Referring to FIG. 7, control device 70 changes the duty summation at the switching control of inverter 20 and inverter 30 according to curve k12 and curve k22, respectively, when the remaining amount of fuel in fuel tank 40 is low, i.e. when the value of signal FUEL is lower than threshold value R0.

Prior to time t1, the remaining amount of fuel in fuel tank 40 is not lower than threshold value R0. Control device 70 alters the duty summation at switching control of inverters 20 and 30 according to curves k1 and k2, respectively, (amplitude set to DT1). Therefore, alternating voltage Vac generated across neutral points N1 and N2 of motor generators MG1 and MG2 attains a voltage level V1 of the commercial power supply (for example, AC 100V).

When the fuel remaining amount becomes lower than threshold value R0 at time t1, control device 70 changes the duty summation at switching control of inverters 20 and 30 according to curves k12 and k22, respectively, having an amplitude DT2 that is smaller than amplitude DT1. Therefore, alternating voltage Vac generated across neutral points N1 and N2 of motor generators MG1 and MG2 attains a voltage level of V2 (for example, AC 95V) lower than voltage level V1 of the commercial power supply.

The user of an external load receiving supply of alternating voltage Vac can recognize change in the electric equipment (for example, the light becomes dimmer) caused by reduction in the voltage level of alternating voltage Vac. As a result, the user can recognize that the remaining amount of fuel of the vehicle is low.

Although not particularly depicted, the voltage level of alternating voltage Vac may be varied periodically when the fuel remaining amount becomes lower than threshold value R0. Specifically, the level of alternating voltage Vac may be varied periodically between AC 100V and AC 95V. Further, the cycle of varying the level of alternating voltage Vac can be also changed in accordance with the remaining amount of fuel. Specifically, the cycle of varying the level of alternating voltage Vac can be set shorter or longer in accordance with the lower remaining amount of fuel. Furthermore, the duration of the low voltage level may be increased according to the remaining amount of fuel. In such a manner, it is possible to draw the user's attention more definitely.

Figure 8:
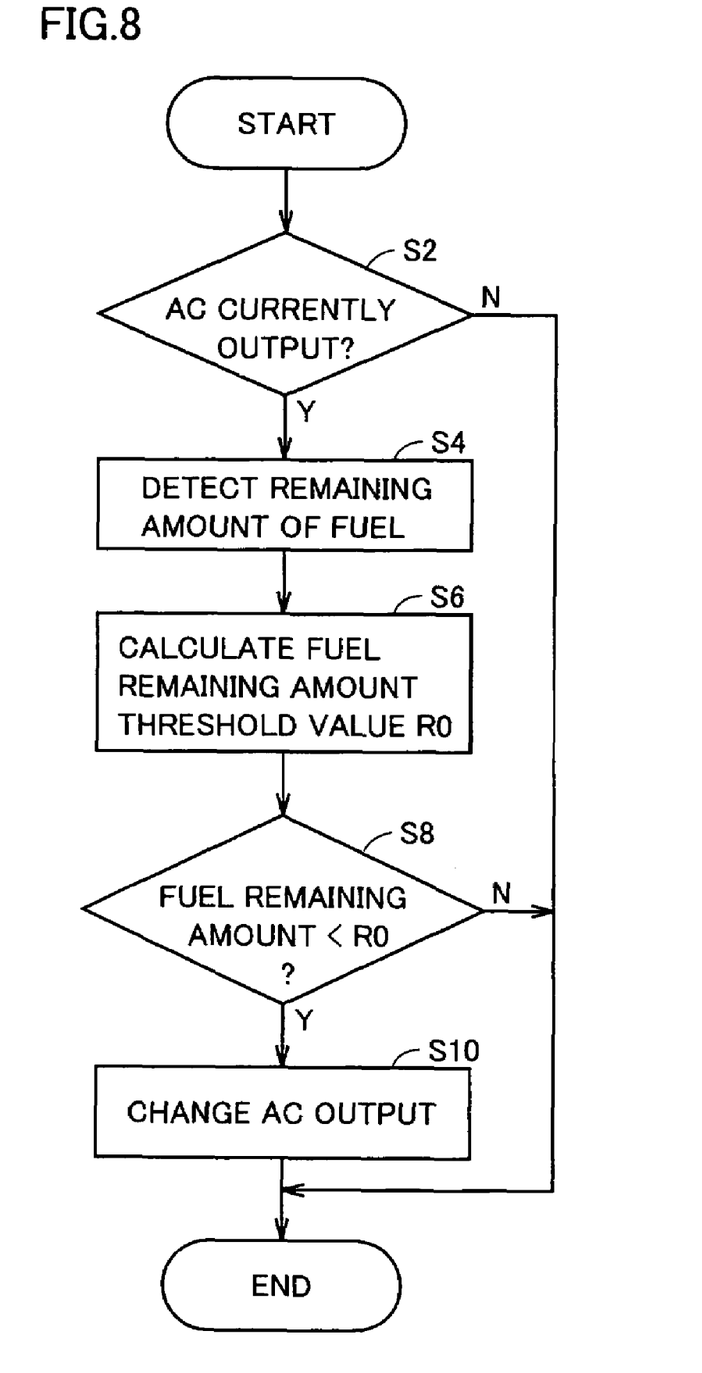
FIG. 8 is a flow chart to describe an operation of the AC control unit in FIG. 4.

FIG. 8 is a flow chart to describe an operation of AC control unit 121 in FIG. 4. Referring to FIG. 8, AC control unit 121 determines whether alternating voltage Vac is currently output to an external load connected to connector 60 based on the presence/absence of an output request of alternating voltage Vac, or the actual output of alternating voltage Vac (step S2). When AC control unit 121 determines that alternating voltage Vac is not currently output (NO at step S2), the process ends without generation of control signals CTL0 and CTL1.

When determination is made that alternating voltage Vac is currently output at step S2 (YES at step S2), AC control unit 121 detects the remaining amount of fuel in fuel tank 40 based on signal FUEL from fuel tank 40 (step S4). Upon detection of the remaining amount of fuel in fuel tank 40, AC control unit 121 calculates threshold value R0 of the remaining amount of fuel (step S6).

AC control unit 121 calculates the required amount of fuel for the vehicle to travel on its own to the nearest fuel station set in advance based on the distance between the nearest fuel station and the current position, and also the average mileage of the vehicle. Threshold value R0 is calculated based on such a calculated result.

Following calculation of threshold value R0 at step S6, AC control unit 121 compares the remaining amount of a fuel detected at step S4 with threshold value R0, and determines whether the fuel remaining amount is lower than threshold value R0 (step S8). When AC control unit 121 determines that the remaining amount of the fuel is lower than threshold value R0 (YES at step S8), control signal CTL1 is generated, which is output to PWM signal conversion unit 122. In response, control device 70 changes alternating voltage Vac that is output to an external load (step S10).

When determination is made that the remaining amount of fuel is not lower than threshold value R0 at step S8 (NO at step S8), AC control unit 121 generates control signal CTL0, which is output to PWM signal conversion unit 122. In other words, control device 70 does not change alternating voltage Vac that is output to the external load. Thus, the series of processing ends.

The above description corresponds to the case where the distance between a preset nearest fuel station and the current position is used in the calculation of threshold value R0 by AC control unit 121. Alternatively, the distance from the current position to the nearest fuel station may be calculated using a car navigation system, and use that calculated result for the calculation of threshold value R0.

Further, the above description corresponds to the case where the detected remaining amount of fuel in fuel tank 40 is compared with threshold value R0 to change alternating voltage Vac based on the compared result. Alternatively, detection can be made whether the fuel reserve warning light attached to the vehicle is illuminated or not, and change alternating voltage Vac when the fuel reserve warning light is lit. Accordingly, the minimum travel distance of the vehicle can be ensured.

In accordance with alternating voltage output apparatus 100 of the first embodiment, alternating voltage Vac output to an external load is altered when the remaining amount of fuel in fuel tank 40 becomes lower than threshold value R0. Therefore, the user of an external load receiving supply of alternating voltage Vac from the vehicle can be notified of the state of low remaining amount of fuel. Since it is not necessary to provide additional notification means, an external notification function directed to the state of low remaining amount of fuel state can be realized.

When the remaining amount of fuel in fuel tank 40 becomes lower than threshold value R0, alternating voltage output apparatus 100 cuts off alternating voltage Vac through short interruption, or reduces the voltage level of alternating voltage Vac. Therefore, the user can be notified of the fuel state reliably by the change in the illumination of the light that is receiving supply of alternating voltage Vac.

Further, the voltage level of alternating voltage Vac can be changed periodically, or the varying period can be altered in accordance with the fuel remaining amount when the fuel remaining amount is lower than threshold value R0. Therefore, it is possible to draw the user's attention more definitely.

Since alternating voltage output apparatus 100 calculates threshold value R0 of the fuel remaining amount based on the distance between the current position and the nearest fuel station, the user can be notified upon ensuring the required fuel for the vehicle to travel to the nearest fuel station by itself. Further, by calculating the distance between the current position and the nearest fuel station based on a car navigation system, the user can be notified of the fuel state at a more appropriate timing. By changing alternating voltage Vac corresponding to the turned-on state of the fuel reserve warning light, the user can be notified of the fuel state at a timing equivalent to that when driving a car.

By controlling the potential across neutral points N1 and N2 of motor generators MG1 and MG2, alternating voltage output apparatus 100 can generate alternating voltage Vac for commercial power supply across neutral points N1 and N2 to supply the generated alternating voltage Vac to a load external to the vehicle.

Second Embodiment

The first embodiment is directed to notifying a user outside a vehicle of the short power-generation allowable time by changing the output of alternating voltage Vac when the remaining amount of fuel is low. The second embodiment notifies a user through a sounding device, a light device or the like basically attached to the vehicle.

Figure 9:
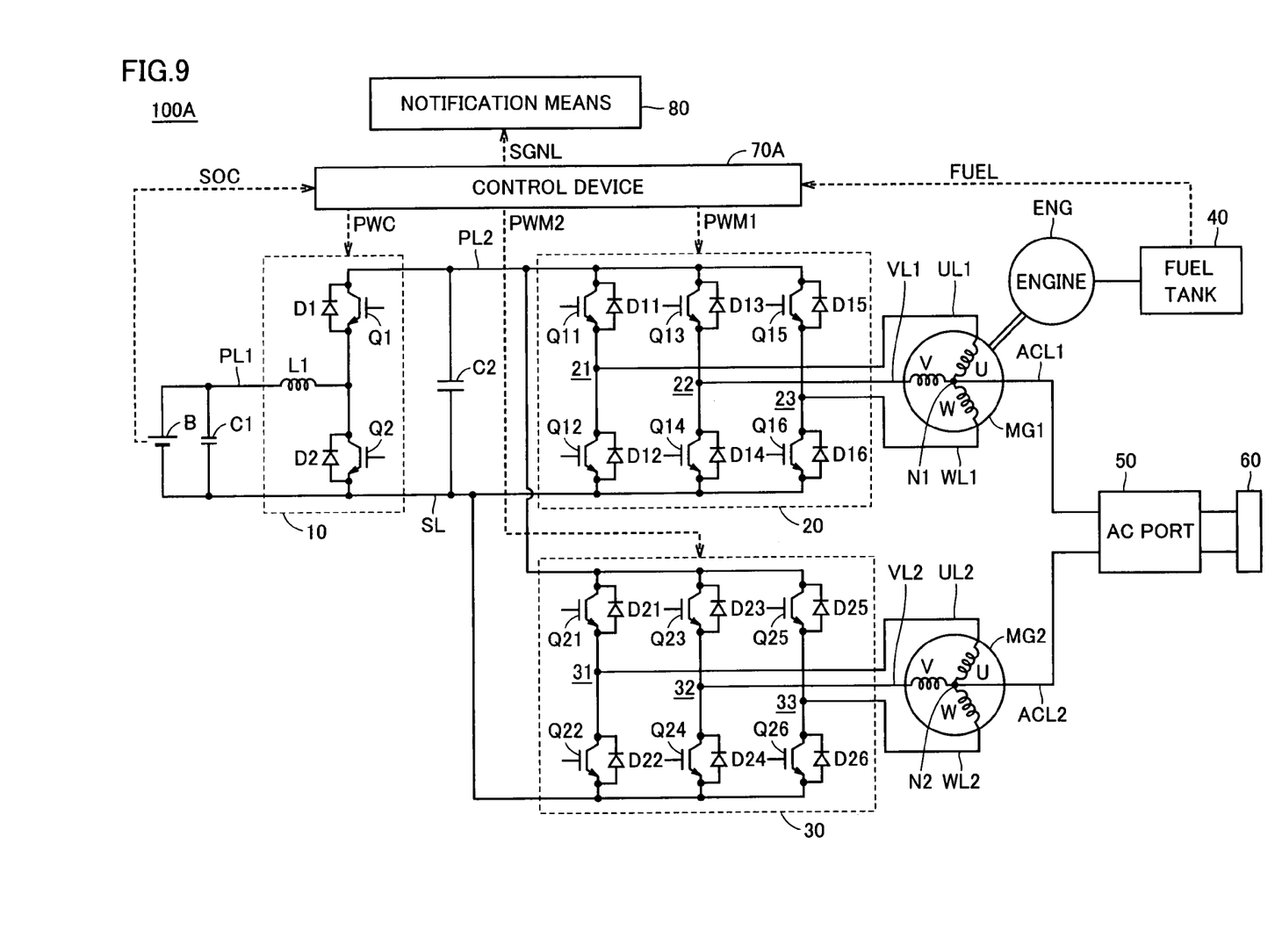
FIG. 9 is a schematic block diagram of an alternating voltage output apparatus according to a second embodiment of the present invention.

FIG. 9 is a schematic block diagram of an alternating voltage output apparatus 100A according to a second embodiment of the present invention. Referring to FIG. 9, alternating voltage output apparatus 100A includes, based on the configuration of alternating voltage output apparatus 100 of the first embodiment shown in FIG. 1, a control device 70A instead of control device 70, and notification means 80. The remaining configuration of alternating voltage output apparatus 100A is identical to that of alternating voltage output apparatus 100.

Control device 70A differs from control device 70 of the first embodiment in operation when the remaining amount of fuel in fuel tank 40 is lower than threshold value R0. Specifically, when the remaining amount of fuel in fuel tank 40 becomes lower than threshold value R0, control device 70A generates and outputs to notification means 80 a signal SGNL while maintaining the current state of generating alternating voltage Vac.

Notification means 80 is, for example, a sounding device basically provided in a vehicle, and outputs a warning sound upon receiving signal SGNL from control device 70A. When the remaining amount of fuel in fuel tank 40 becomes low, alternating voltage output apparatus 100A notifies the user outside of the vehicle of the low remaining amount of fuel by means of the sounding device.

Figure 10:
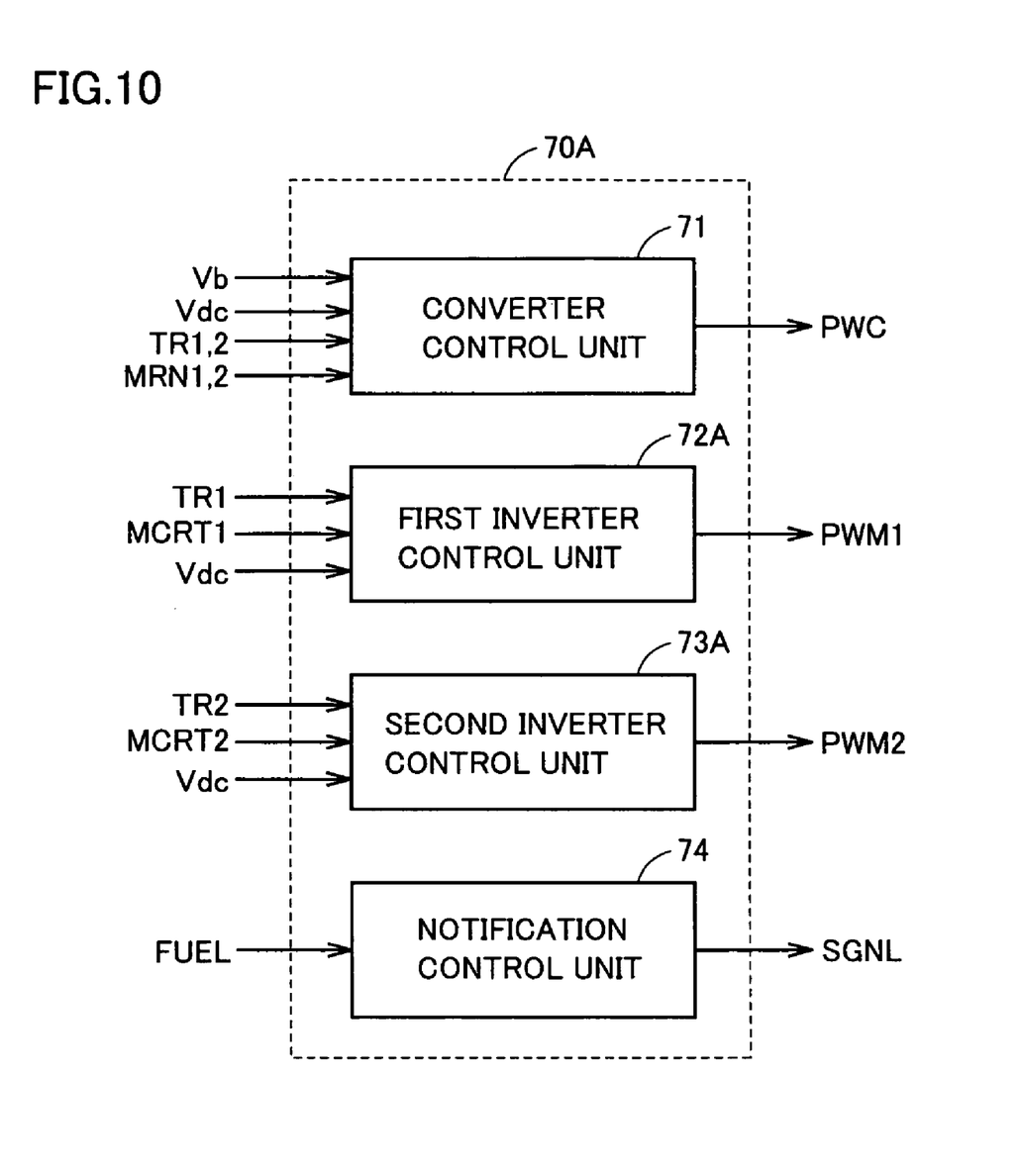
FIG. 10 is a functional block diagram of the control device in FIG. 9.

FIG. 10 is a functional block diagram of control device 70A shown in FIG. 9. Referring to FIG. 10, control device 70A includes, based on the configuration of control device 70 of the first embodiment shown in FIG. 2, first and second inverter control units 72A and 73A instead of first and second inverter control units 72 and 73, and a notification control unit 74.

First and second inverter control units 72A and 73A generate signals PWM1 and PWM2 such that alternating voltage Vac is generated across neutral points N1 and N2 of motor generators MG1 and MG2 when output of alternating voltage Vac is requested, independent of the remaining amount of fuel in fuel tank 40. The remaining features of first and second inverter control units 72A and 73A are identical to those of first and second inverter control units 72 and 73 of the first embodiment.

When signal FUEL representing the remaining amount of fuel in fuel tank 40 is received from fuel tank 40, and the value of signal FUEL is lower than threshold value R0, notification control unit 74 generates and outputs to notification means 80 signal SGNL.

Figure 11:
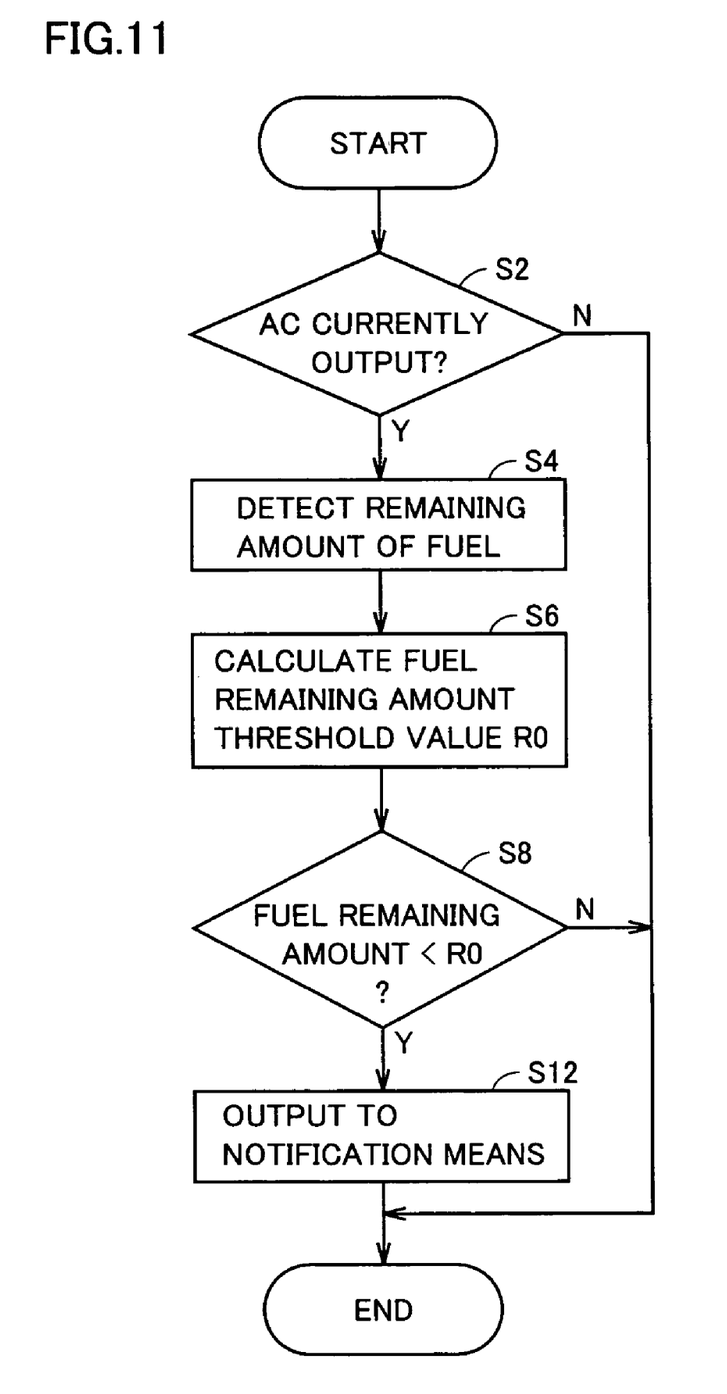
FIG. 11 is a flow chart to describe an operation of the notification control unit in FIG. 10.

FIG. 11 is a flow chart to describe the operation of notification control unit 74 of FIG. 10. The process flow of FIG. 11 includes step S12 instead of step S10 of the process flow of FIG. 8. Specifically, when determination is made that the remaining amount of fuel is lower than threshold value R0 (YES at step S8), notification control unit 74 generates signal SGNL, and outputs the generated signal SGNL to notification means 80 (step S12).

When determination is made that the remaining amount of fuel is not lower than threshold value R0 at step S8 (NO at step 8), the process ends without notification control unit 74 generating signal SGNL. Threshold value R0 is calculated in a way similar to that of the first embodiment.

The above description corresponds to the case where notification means 80 is a sounding device. Alternatively, notification means 80 may be a light device. The light device may be a headlamp, or a direction indicator, a brake lamp, and the like.

Although not illustrated, a clocking function may be employed to take into consideration the surrounding environment such that notification is provided by a sounding device during the daytime and by a light device during the nighttime.

The above description corresponds to the case where the remaining amount of fuel in fuel tank 40 is detected to be compared with threshold value R0, and signal SGNL is output to notification means 80 based on the comparison result. Alternatively, detection can be made whether the fuel reserve warning light attached to the vehicle is illuminated or not, and output signal SGNL to notification means 80 when the fuel reserve warning light is lit.

Since the notification means of the low remaining amount of fuel is realized using a sounding device or light device attached to the vehicle, no additional notification means for realizing an external notification function is required. The external notification function can be realized readily and at low cost.

By selectively using a sounding device and a light device appropriately as the notification means, i.e. using a sounding device during the daytime while it is light and by a light device during the relatively quiet nighttime while it is dark, an external notification function can be provided while taking into account the surroundings.

Third Embodiment

In the previous first and second embodiments, alternating voltage Vac is generated across neutral points N1 and N2 of motor generators MG1 and MG2. In the third embodiment, an inverter that generates alternating voltage Vac is additionally provided.

Figure 12:
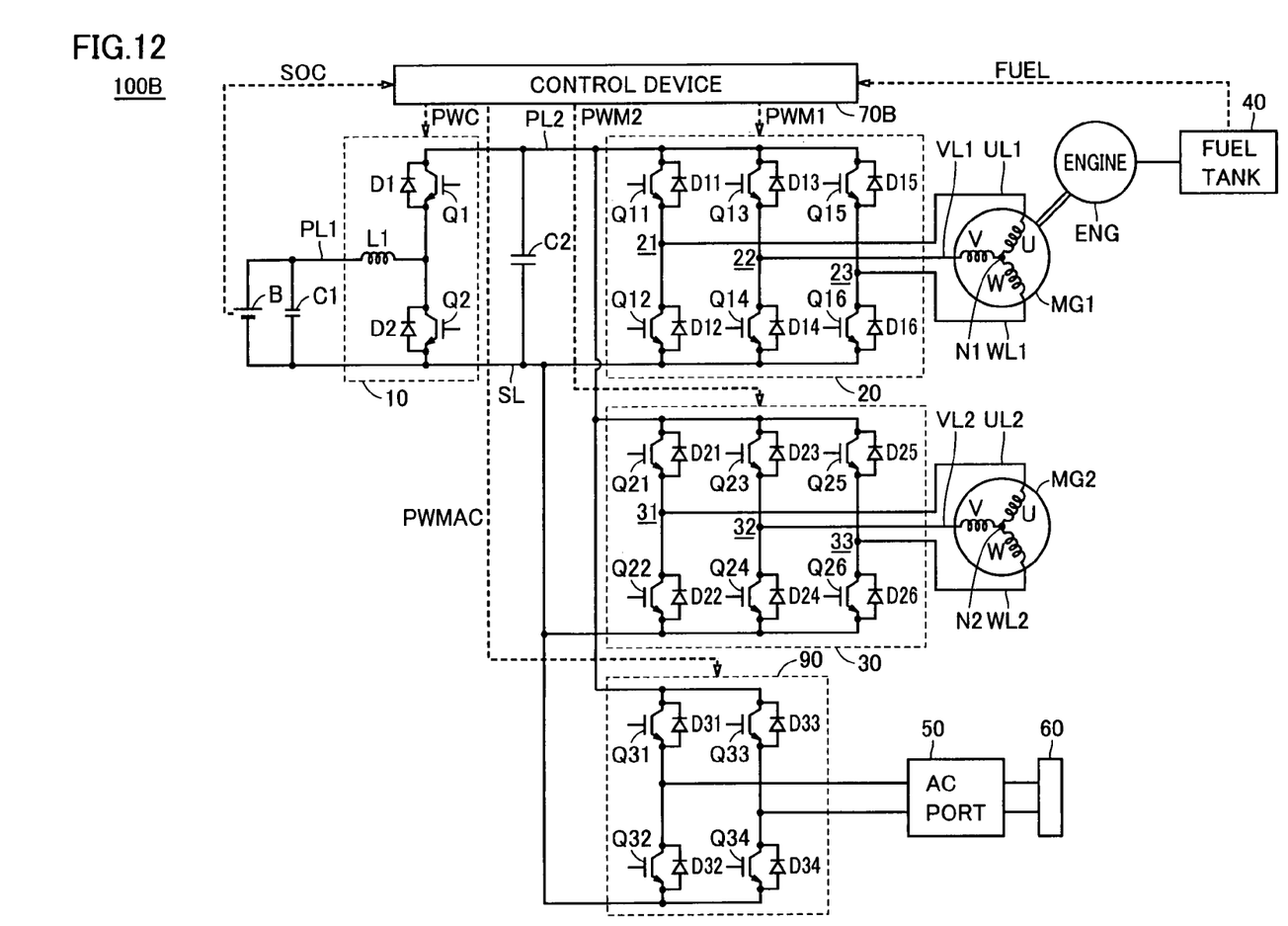
FIG. 12 is a schematic block diagram of an alternating voltage output apparatus according to a third embodiment of the present invention.

FIG. 12 is a schematic block diagram of an alternating voltage output apparatus according to a third embodiment of the present invention. Referring to FIG. 12, an alternating voltage output apparatus 100B includes, in the configuration of alternating voltage output apparatus 100 of the first embodiment shown in FIG. 1, an inverter 90, and a control device 70B instead of control device 70. It is to be noted that AC lines ACL1 and ACL2 connected to neutral points N1 and N2 of motor generators MG1 and MG2 are absent. AC port 50 is connected to inverter 90.

Inverter 90 includes npn transistors Q31-Q34, and diodes D31-D34. Npn transistors Q31 and Q32 are connected in series between power supply line PL2 and ground line SL. Npn transistors Q33 and Q34 are also connected in series between power supply line PL2 and ground line SL. Npn transistors Q31 and Q32 connected in series and npn transistors Q33 and Q34 connected in series are connected in parallel between power supply line PL2 and ground line SL. Diodes D31-D34 are connected anti-parallel with npn transistors Q31-Q34, respectively. The connection node of npn transistors Q31 and Q32 and the connection node of npn transistors Q33 and Q34 are connected to AC port 50.

Inverter 90 responds to signal PWMAC from control device 70B to convert the direct-current voltage supplied from power supply line PL2 into alternating voltage Vac for commercial power supply, and outputs alternating voltage Vac to AC port 50.

When output of alternating voltage Vac to an external load connected to connector 60 is requested, control device 70B generates signal PWMAC to control inverter 90 such that alternating voltage Vac is generated. The generated signal PWMAC is output to inverter 90.

When the remaining amount of fuel in fuel tank 40 becomes lower than threshold value R0, control device 70B generates signal PWMAC such that the output of alternating voltage Vac from inverter 90 changes.

Since a dedicated inverter 90 to generate alternating voltage Vac is provided in the third embodiment, control device 70B does not have to generate signals PWM1 and PWM2 in order to generate alternating voltage Vac across neutral points N1 and N2 of motor generators MG1 and MG2. The remaining function of control device 70B is identical to that of control device 70 of the first embodiment.

Although a dedicated inverter 90 is required to generate alternating voltage Vac in third embodiment, control of inverters 20 and 30 can be simplified as compared to the first and second embodiments in which alternating voltage Vac is generated across neutral points N1 and N2 of motor generators MG1 and MG2.

Although not illustrated, a sounding device or light device of the vehicle can be used as external notification means instead of changing the output of alternating voltage Vac output from inverter 90, when the remaining amount of fuel in fuel tank 40 becomes low, likewise the second embodiment corresponding to the first embodiment.

The above embodiments are described in which modification of the output of alternating voltage Vac or notification by notification means 80 is conducted based on the remaining amount of fuel in fuel tank 40. Additionally, the SOC (State of Charge) of battery B may be taken into account, instead of or together with the remaining amount of fuel in fuel tank 40. Specifically, when the SOC of battery B becomes lower than a threshold value S0, the output of alternating voltage Vac can be changed, or notification means 80 be operated.

In the above description, engine ENG corresponds to "internal combustion engine". Motor generators MG1 and MG2 corresponds to "power generator" and "motor", respectively. In the first and second embodiments, inverters 20 and 30 and motor generators MG1 and MG2 corresponds to "voltage supply device". In the third embodiment, inverter 90 corresponds to "voltage supply device".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An alternating voltage output apparatus incorporated in a vehicle, comprising:
    an internal combustion engine,
    a fuel tank storing fuel to be supplied to said internal combustion engine,
    a voltage supply device generating alternating voltage having a predetermined frequency using electric power generated through a driving force from said internal combustion engine, and supplying the generated alternating voltage to a load external to said vehicle, and
    a control device controlling an operation of said voltage supply device,
    wherein said control device controls said voltage supply device such that, when a remaining amount of said fuel is lower than a predetermined amount, said alternating voltage changes in a manner different from the alternating voltage of a state where said remaining amount of fuel is not lower than said predetermined amount.

2. The alternating voltage output apparatus according to claim 1, wherein said control device controls said voltage supply device such that, when said remaining amount of fuel is lower than said predetermined amount, said alternating voltage is cut off through short interruption.

3. The alternating voltage output apparatus according to claim 1, wherein said control device controls said voltage supply device such that, when said remaining amount of fuel is lower than said predetermined amount, a voltage level of said alternating voltage is lowered down to a predetermined voltage level.

4. The alternating voltage output apparatus according to claim 1, wherein said control device controls said voltage supply device such that, when said remaining amount of fuel is lower than said predetermined amount, a voltage level of said alternating voltage changes periodically.

5. The alternating voltage output apparatus according to claim 4, wherein said control device controls said voltage supply device such that a changing cycle of the voltage level of said alternating voltage becomes shorter or longer in accordance with reduction in said remaining amount of fuel.

* * * * *